Nov. 10, 1959 J. V. ERWIN Re. 24,733

DRUM HEAD AND LIKE ASSEMBLIES

Original Filed June 28, 1955

INVENTOR.
JAMES V. ERWIN
BY
McMorrow, Berman & Davidson
ATTORNEYS

United States Patent Office

Re. 24,733
Reissued Nov. 10, 1959

24,733

DRUM HEAD AND LIKE ASSEMBLIES

James V. Erwin, St. Paul, Minn.

Original No. 2,830,484, dated April 15, 1958, Serial No. 518,616, June 28, 1955. Application for reissue October 10, 1958, Serial No. 766,636

4 Claims. (Cl. 84—414)

Matter enclosed in heavy brackets [ ] appears in the original patent but forms no part of this reissue specification; matter printed in italics indicates the additions made by reissue.

This invention relates to a head for a musical instrument.

An object of the present invention is to provide a head for a musical instrument which replaces the head fabricated wholly of animal skin.

Another object of the present invention is to provide a head for a musical instrument which is not susceptible to moisture absorption, and which does not require constant adjustment for tension when in use.

A further object of the present invention is to provide a head for a musical instrument which is flexible over a wide temperature range, is resistant to the action of oil or grease, and gives a constant tone.

Other objects and advantages of the present invention will become apparent from the following description taken in conjunction with the accompanying drawings, in which.

Figure 1:
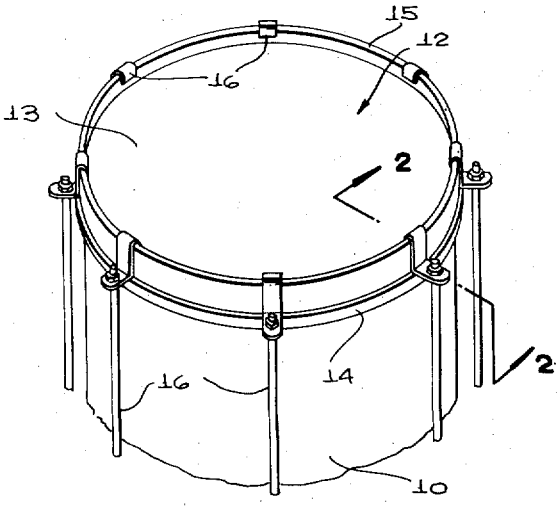
Figure 1 is a fragmentary perspective view of a drum having a head of the present invention applied thereto.

Referring to the drawing the numeral 10 designates a percussion musical instrument such as a drum which has an *annular* open top 11. Stretched over the open top 11 of the instrument or drum 10 is a head of the present invention designated by the numeral 12, the head being attached to the instrument or drum as shown in Figure 1. The head 12 embodies a sheet 13 fabricated wholly of a thermoplastic polyester resin such as the condensation polymer of ethylene glycol and terephthalic acid. *Such resin sheet is water-resistant and homogeneous. Being multi-directionally tensilized and oriented molecularly, it retains its set tension in use. It further has uniform flexible characteristics over wide ranges in temperature.* The *multi-directionally tensilized* sheet marketed under the trademark "Mylar" by the E. I. du Pont de Nemours & Co., Inc., of Wilmington, Delaware, has been found satisfactory for producing the head of the present invention.

*Animal hides, nearly universally employed commercially in drums and similar instruments prior to my invention, are relatively limp and readily can be drawn over compound-curved surfaces, particularly upon being thoroughly soaked in water. This is not the case with the polyester resin sheets I employ. As mentioned above, such resin sheets are water-resistant. They are quite stiff, even in relatively thin films, and resist being formed in compound curvatures without wrinkling, or at least without formation therein of complex uneven stress lines. Even tiny wrinkles promote cracks in the sheet. Moreover, as is well known, drum heads which are unevenly stressed emit uneven, unpleasant sounds.*

Figure 3:
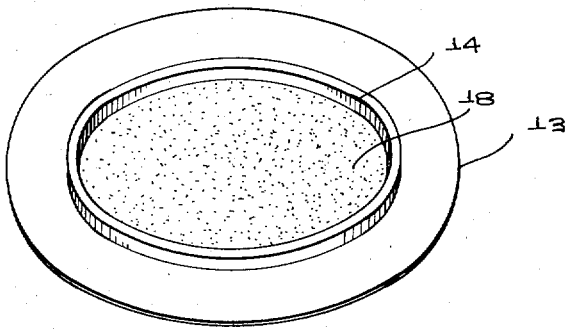
Figure 3 is a bottom perspective view of the polyester resin sheet of the present invention having the hoop in position thereon, but before it is attached to such hoop.

[Preferably, the sheet 13, Figure 3, is stretched over a hoop 14 with the portion adjacent its boundary]

Figure 2:
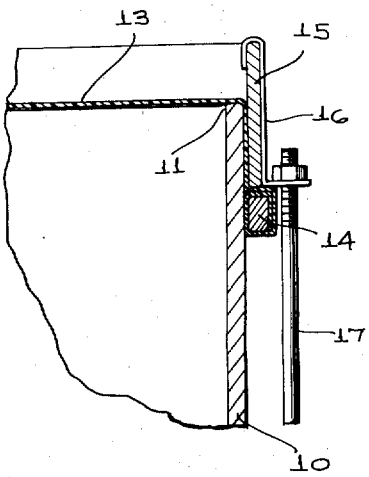
Figure 2 is an enlarged fragmentary sectional view taken on the line 2—2 of Figure 1.

*Referring now to Figures 2 and 3, the sheet 13 is preferably stretched over a hoop 14, also of annular shape. For purposes of illustration, in Figure 2, the vertical distance between the hoop 14 and open end 11 is greatly exaggerated. Actually this distance is usually very small. In being stretched over the hoop 14, the portion of sheet 13 adjacent its boundary is* wrapped about the hoop and then heat is applied to such portion of a temperature and for a sufficient time to cause it to soften and form and heat seal to itself with the thus formed seal looped about the hoop. A temperature of from 240° to 245° centigrade causes the heat sealing of the aforesaid portion to itself. It is to be understood that care must be taken in the heat [sealing] *forming* operation to keep the sheet from shrinking. Also, the thermo-plastic polyester resin should be treated so as to give a sheet having the necessary physical properties. The sheet 13 has a tensile strength in the order of 25,000 pounds per square inch. This figure for an unsupported sheet is placed in its proper significance when it is considered that for spring steel the tensile strength is 75,000 pounds per square inch. The impact strength of the sheet 13 is about 75 kilogram per cubic meter for a one mil thick section. In stretching the plastic sheet 13 to the yield point of 13,000 pounds per square inch, the [stress] *strain* is from 3 to 4%.

The thus obtained sheet and hoop assembly is placed over the open top 11 of the drum 10 so that the sheet is stretched over the open top with the hoop embracingly engaging the instrument or drum 10 adjacent the open top thereof, Figure 2. Means is provided for detachably securing the sheet and hoop assembly to the instrument or drum 10, such means comprising a draw ring 15, Figure 1, which extends about the open top of the drum and has its lower end resting upon the hoop 14 with the upper end above the open top 11 of the drum 10, and a plurality of clamps 16 arranged in spaced relation, each having the upper end portion embracingly engaging the upper end of the ring 15 with the lower end portion detachably secured to bolts 17 carried by the drum base, not shown.

The portion of the under face of the sheet 13 within the open top 11 of the instrument or drum 10 is coated with a decorative material 18. The decorative material may be a paint, pigment or a deposit of metal, such as aluminum.

Figure 4:
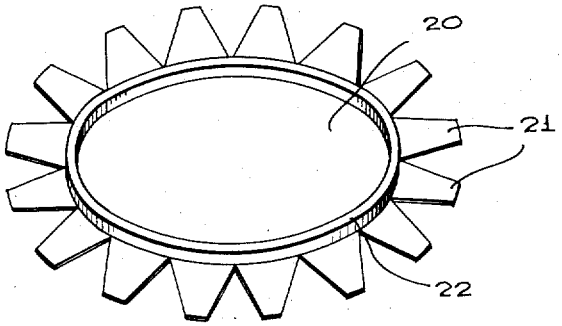
Figure 4 is a bottom perspective view of the polyester resin sheet of the present invention, but with the boundary provided with projecting tabs, and the hoop in position thereon, but before the tabs are attached to such hoop.

In place of the sheet 13 being applied to the hoop 14 by application of heat to the portion inwardly of the boundary as above described, the sheet may be fixedly attached to the hoop without the application of heat. By reference to Figure 4 it will be seen that sheet 20 is provided with a plurality of tabs 21 which project from the boundary thereof. Such sheet may be attached to a hoop 22 by placing the hoop upon the sheet so that it is just inwardly of the tabs, Figure 3, and then wrapping the respective tabs about the hoop 22. The thus formed sheet and hoop assembly is placed over the open top 11 of the drum 10 in the same manner as previously described in connection with the sheet 13 and hoop 14 assembly. Preferably, the hoop 22 is covered with a pressure sensitive or heat sensitive adhesive to hold the tabs in place while they are being wrapped to their final position.

The head of the present invention is not susceptible to moisture absorption, does not require constant adjustment for tension as in the case of a head made of animal skin, is flexible over a wide range of temperature, for example, from minus 80° to 300° Fahrenheit, is not affected by oil or grease, and gives a more constant and uniform tone than in the case of heads made of animal skins.

This invention has been described in connection with a drum, but it is to be understood that it is also applicable for a head for a banjo.

In the case of a toy drum, the head plastic sheet of the present invention should be 0.00025 inch thick, for the snare side of a drum from 0.001 to 0.002 inch thick, for the front side of a snare drum or bass drum from 0.005 to 0.0075 inch thick.

Having thus described the invention what is new and desired to be secured by Letters Patent is:

[1. A head for use on drums, banjoes and the like, said head comprising a sheet of homogeneous material, said sheet being resistant to water, having substantially uniform flexible characteristics over a wide range of temperature, and retaining its set tension when in use, said material comprising a thermoplastic polyester resin.]

[2. A head according to claim 1 in which the thermoplastic polyester resin is a condensation polymer of ethylene glycol and terephthalic acid.]

*3. A drum head assembly comprising an annular member having an initially multi-directionally tensilized water-resistant homogeneous thermoplastic polyester resin sheet mounted thereon, the marginal portion of said sheet extending at least partially about said member, the central head portion of said sheet within said marginal portion being tensilized essentially in its initial condition, said sheet where extending about said portion of said member being secured in intimate and smooth contact therewith.*

*4. The drum head assembly of claim 3 wherein said polyester resin is a condensation polymer of polyethylene glycol and terephthalic acid.*

*5. A drum head assembly comprising an annular member having an initially multi-directionally tensilized water-resistant homogeneous thermoplastic polyester resin sheet mounted thereon, the marginal portion of said sheet being contoured in compound curvature at least partially about said member, the central head portion of said sheet within said marginal portion being tensilized essentially in its initial condition, said sheet where contoured in compound curvature about said portion of said member being secured in intimate and smooth contact therewith.*

*6. The drum head assembly of claim 5 wherein said polyester resin is a condensation polymer of polyethylene glycol and terephthalic acid.*

References Cited in the file of this patent or the original patent

UNITED STATES PATENTS

| | | |
|---|---|---|
| 794,658 | Boulanger | July 11, 1905 |
| 2,018,182 | Logan | Oct. 22, 1935 |
| 2,110,029 | Shastock | Mar. 1, 1938 |
| 2,465,319 | Whinfield et al. | Mar. 22, 1949 |
| 2,490,451 | Magid | Dec. 6, 1949 |
| 2,497,376 | Swallow et al. | Feb. 14, 1950 |
| 2,641,592 | Hofrichter | June 9, 1953 |
| 2,667,098 | McMullen | Jan. 26, 1954 |
| 2,681,296 | Dobbs et al. | June 15, 1954 |
| 2,768,107 | Magid | Oct. 23, 1956 |
| 2,802,764 | Slayter et al. | Aug. 13, 1957 |

FOREIGN PATENTS

| | | |
|---|---|---|
| 14,170 | Great Britain | 1890 |
| 87,420 | Germany | June 29, 1896 |